United States Patent
Zhang

(10) Patent No.: US 12,497,013 B2
(45) Date of Patent: Dec. 16, 2025

(54) ELECTRONIC MECHANICAL BRAKING METHOD AND ELECTRONIC MECHANICAL BRAKING APPARATUS

(71) Applicant: SHENZHEN YINWANG INTELLIGENT TECHNOLOGIES CO., LTD., Shenzhen (CN)

(72) Inventor: Haiyang Zhang, Shenzhen (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 384 days.

(21) Appl. No.: 18/300,083

(22) Filed: Apr. 13, 2023

(65) Prior Publication Data
US 2023/0249660 A1    Aug. 10, 2023

Related U.S. Application Data

(63) Continuation of application No. PCT/CN2020/120523, filed on Oct. 13, 2020.

(51) Int. Cl.
*B60T 13/74* (2006.01)

(52) U.S. Cl.
CPC ....... *B60T 13/746* (2013.01); *B60T 2201/022* (2013.01); *B60T 2250/03* (2013.01); *B60T 2250/042* (2013.01)

(58) Field of Classification Search
CPC ............. B60T 13/746; B60T 2201/022; B60T 2250/03; B60T 2250/042; B60T 2220/04; B60T 2270/402; B60T 2270/413; B60T 17/22; B60T 8/58; B60T 8/885

USPC .............................................. 701/70, 76, 78
See application file for complete search history.

(56) References Cited

U.S. PATENT DOCUMENTS

| | | | |
|---|---|---|---|
| 9,227,608 | B2 | 1/2016 | Hill et al. |
| 2008/0021623 | A1 | 1/2008 | Frey et al. |
| 2012/0316733 | A1 | 12/2012 | Futamura et al. |
| 2017/0232848 | A1 | 8/2017 | Lian et al. |
| 2018/0056961 | A1 | 3/2018 | Krueger et al. |
| 2020/0039485 | A1 | 2/2020 | Satoh et al. |
| 2021/0009095 | A1 | 1/2021 | Kim |
| 2023/0011677 | A1 | 1/2023 | Li et al. |

FOREIGN PATENT DOCUMENTS

| | | |
|---|---|---|
| CN | 101380952 A | 3/2009 |
| CN | 101774372 A | 7/2010 |
| CN | 105691241 A | 6/2016 |
| CN | 109747615 A | 5/2019 |
| CN | 110682920 A | 1/2020 |
| CN | 110737192 A | 1/2020 |
| CN | 111762179 A | 10/2020 |
| DE | 102009046234 A1 | 5/2011 |

(Continued)

*Primary Examiner* — Hai H Huynh
(74) *Attorney, Agent, or Firm* — Conley Rose, P.C.

(57) ABSTRACT

An electronic mechanical braking method for an intelligent vehicle, a new energy vehicle, or a traditional automobile includes obtaining status information of a first control unit for performing braking control on a vehicle, where the status information is indicates whether the first control unit works normally, and when the status information indicates that the first control unit cannot work normally, performing the braking control on the vehicle using a second control unit.

20 Claims, 7 Drawing Sheets

(56) References Cited

FOREIGN PATENT DOCUMENTS

| | | | |
|---|---|---|---|
| JP | H01275255 A | 11/1989 | |
| JP | 2001522331 A | 11/2001 | |
| JP | 2008168779 A | 7/2008 | |
| JP | 2010534591 A | 11/2010 | |
| JP | 4997347 B1 * | 8/2012 | ............ G01C 21/26 |
| WO | 2018181807 A1 | 10/2018 | |

* cited by examiner

ELECTRONIC MECHANICAL BRAKING METHOD AND ELECTRONIC MECHANICAL BRAKING APPARATUS

CROSS-REFERENCE TO RELATED APPLICATIONS

This application is a continuation application of International Patent Application No. PCT/CN2020/120523 filed on Oct. 13, 2020, the disclosure of which is hereby incorporated by reference in its entirety.

TECHNICAL FIELD

This application pertains to the field of vehicle technologies, and more specifically, relates to an electronic mechanical braking method and an electronic mechanical braking apparatus in a vehicle.

BACKGROUND

A braking system of a vehicle is a system that applies specific braking force to a wheel of the vehicle, so as to perform a specific degree of forced braking on the wheel. A braking control system is used to make a traveling vehicle forcibly decelerate or even stop as required by a driver or a controller, or to make a traveling-stopped vehicle stably parked in various road conditions (for example, on a ramp), or to make a vehicle travel downhill at a stable speed.

Because a conventional brake system is usually hydraulic braking, but the hydraulic braking has problems such as a complex arrangement, a slow response, low energy efficiency, and an expensive high-redundancy hydraulic system. Therefore, an electronic mechanical braking (EMB) system appears. The electronic mechanical braking system has advantages of a simple arrangement and a quick response, and can meet requirements of rapid development of automobile technologies, especially requirements of electrification of automobiles.

In addition, with development of intelligent vehicles, autonomous driving will replace manual driving increasingly. This also imposes a higher requirement on vehicle control safety. Although an existing electronic mechanical braking system has higher safety than the hydraulic braking system, a higher safety requirement cannot be met currently, especially once a braking control unit of the EMB system is faulty or fails, a serious safety risk may be caused.

Therefore, how to improve a braking control effect to improve vehicle control safety is an urgent technical problem to be resolved.

SUMMARY

This application provides an electronic mechanical braking method and an electronic mechanical braking apparatus, to improve a braking control effect, to improve vehicle control safety.

According to a first aspect, an electronic mechanical braking method is provided, including: obtaining status information of a first control unit, where the status information is used to indicate whether the first control unit works normally, and the first control unit is configured to perform braking control on a vehicle; and when the status information indicates that the first control unit cannot work normally, performing the braking control on the vehicle by using a second control unit.

In the technical solutions of this application, a plurality of control units are used to implement EMB control. Therefore, when one of the control units fails, the rest of the control units may further be used to continue the control, to implement redundant braking, effectively improve a braking control effect, and improve vehicle control safety.

It should be noted that, an embodiment of this application mainly provides an EMB apparatus including a plurality of control units to implement redundancy control on a vehicle. Therefore, a specific quantity of control units is not limited. To some extent, a larger quantity of control units indicates higher safety. However, it should be understood that the control units occupy large storage space and a large amount of computing resources. An excessive large quantity of control units may be adverse to vehicle control. Therefore, an appropriate quantity of control units may be selected based on limitations including a safety requirement of the vehicle and hardware and software conditions such as storage space and computing resources in the vehicle. FIG. 4 is merely an example in which two control units are included, and a quantity of control units may alternatively be any integer greater than 2.

Optionally, one of the plurality of control units may be selected as a primary control unit, and the other control units are all secondary control units.

Optionally, priority sorting may be further performed on the plurality of control units, and a control unit with a highest priority is first used. When the control unit with the highest priority cannot work normally, a control unit with a second highest priority is selected, and so on, until a control unit that can work normally is found.

In such a manner of performing redundancy control by using a plurality of control units, a control failure caused when a single control unit fails is avoided, to effectively improve a control effect of braking control and improve safety of a vehicle.

With reference to the first aspect, in some implementations of the first aspect, when the first control unit or the second control unit performs the braking control, the following steps may be performed: obtaining input information, the input information includes at least one of the following: power supply information, ignition information, wheel speed information, vehicle speed information, acceleration information, pedal information, steering angle information, yaw velocity information, or braking requirement information; and processing the input information to obtain braking control information, where the braking control information is used to indicate a wheel brake of the vehicle to provide corresponding braking force for a wheel.

With reference to the first aspect, in some implementations of the first aspect, the input information may include wheel speed information and vehicle speed information. In this case, the following processing may be performed on the input information to obtain the braking control information: calculating a first vehicle speed by using the wheel speed information, and obtaining a second vehicle speed from the vehicle speed information; obtaining a slip ratio of the vehicle by using the first vehicle speed and the second vehicle speed, where the slip ratio is used to indicate an offset degree of the first vehicle speed relative to the second vehicle speed; and generating the braking control information by using the slip ratio.

Such a manner of adjusting the braking force of the wheel based on the slip ratio (that is, anti-slip control) can ensure stability and driving performance of the vehicle. In other words, in a working condition in which the vehicle slips, braking force provided by the wheel brake is controlled, to reduce a slip degree of the vehicle, to improve drive performance and stability.

With reference to the first aspect, in some implementations of the first aspect, the generating the braking control information by using the slip ratio may include performing at least one of the following operations:

When the slip ratio is greater than or equal to a first threshold, the braking control information is used to indicate the wheel brake to increase the braking force; when the slip ratio is less than or equal to a second threshold, the braking control information is used to indicate the wheel brake to reduce the braking force; or when the slip ratio is less than the first threshold and greater than the second threshold, the braking control information is used to indicate the wheel brake not to change the braking force.

Optionally, the input information may further include the steering angle information and the yaw velocity information. In this case, an expected turning degree may be calculated based on the steering angle information, an actual turning degree of the vehicle may be calculated based on a yaw velocity, and then a deviation between the expected turning degree and the actual turning degree is compared with a preset deviation range, to determine specific braking force that needs to be applied to the vehicle, for example, braking force that needs to be applied to, increased, or decreased on a specific wheel, so that a turning degree of the vehicle is more consistent with the expected turning degree.

With reference to the first aspect, in some implementations of the first aspect, the input information includes the steering angle information and the yaw velocity information, and the following processing may be performed on the input information to obtain the braking control information: calculating an expected turning degree by using the steering angle information, and calculating an actual turning degree by using the yaw velocity information; and obtaining the braking control information by using a first deviation between the actual turning degree and the expected turning degree. In the foregoing turning control process, when the vehicle performs understeer or oversteer, the vehicle is enabled to return to an ideal track by controlling the braking force of the wheel, so that stable performance of the vehicle can be implemented.

With reference to the first aspect, in some implementations of the first aspect, the braking control information may be generated based on a relationship between the first deviation and a preset deviation threshold.

Optionally, the input information may further include braking requirement information. The braking requirement information may be a braking requirement sent by an assisted driving system in assisted driving, or may be a braking requirement sent by an autonomous driving system in autonomous driving. In this case, the braking control information may be generated based on the braking requirement, to implement deceleration control on the vehicle. In a case of assisted driving and autonomous driving, the braking control information may be automatically generated based on a deceleration requirement, to implement automatic braking control on the vehicle.

With reference to the first aspect, in some implementations of the first aspect, a step of performing the braking control by the second control unit is the same as a step of performing the braking control by the first braking unit.

According to a second aspect, an electronic mechanical braking apparatus is provided, including a unit that can be configured to perform the method according to any one of the possible implementations of the first aspect.

According to a third aspect, an electronic mechanical braking apparatus is provided. The apparatus includes a processor and a memory. The memory is configured to store instructions, and the processor is configured to execute the instructions stored in the memory, so that the apparatus performs the method according to any one of the possible implementations of the first aspect.

Optionally, the apparatus may be an independent controller in an automobile, or may be a chip having a control function in an automobile. The memory may be a storage unit (for example, a register or a cache) in a chip, or may be a storage unit (for example, a read-only memory (ROM) or a random-access memory (RAM)) in the automobile outside the chip.

It should be noted that, in the foregoing controller, the memory is coupled to the processor. That the memory is coupled to the processor may be understood as that the memory is located inside the processor, or the memory is located outside the processor, to be independent of the processor.

According to a fourth aspect, a computer program product is provided. The computer program product includes computer program code, and when the computer program code is run on a computer, the computer is enabled to perform the method according to the first aspect.

It should be noted that all or some of the computer program code may be stored in a first storage medium. The first storage medium may be encapsulated together with a processor, or may be encapsulated separately from a processor. This is not limited in this embodiment of this application.

According to a fifth aspect, a computer-readable medium is provided. The computer-readable medium stores program code, and when the computer program code is run on a computer, the computer is enabled to perform the method according to the first aspect.

DESCRIPTION OF EMBODIMENTS

An electronic mechanical braking method and/or apparatus provided in embodiments of this application may be applied to various vehicles. The method and/or apparatus may be applied to manual driving, assisted driving, and autonomous driving. The following describes the technical solution in embodiments of this application with reference to the accompanying drawings.

Figure 1:
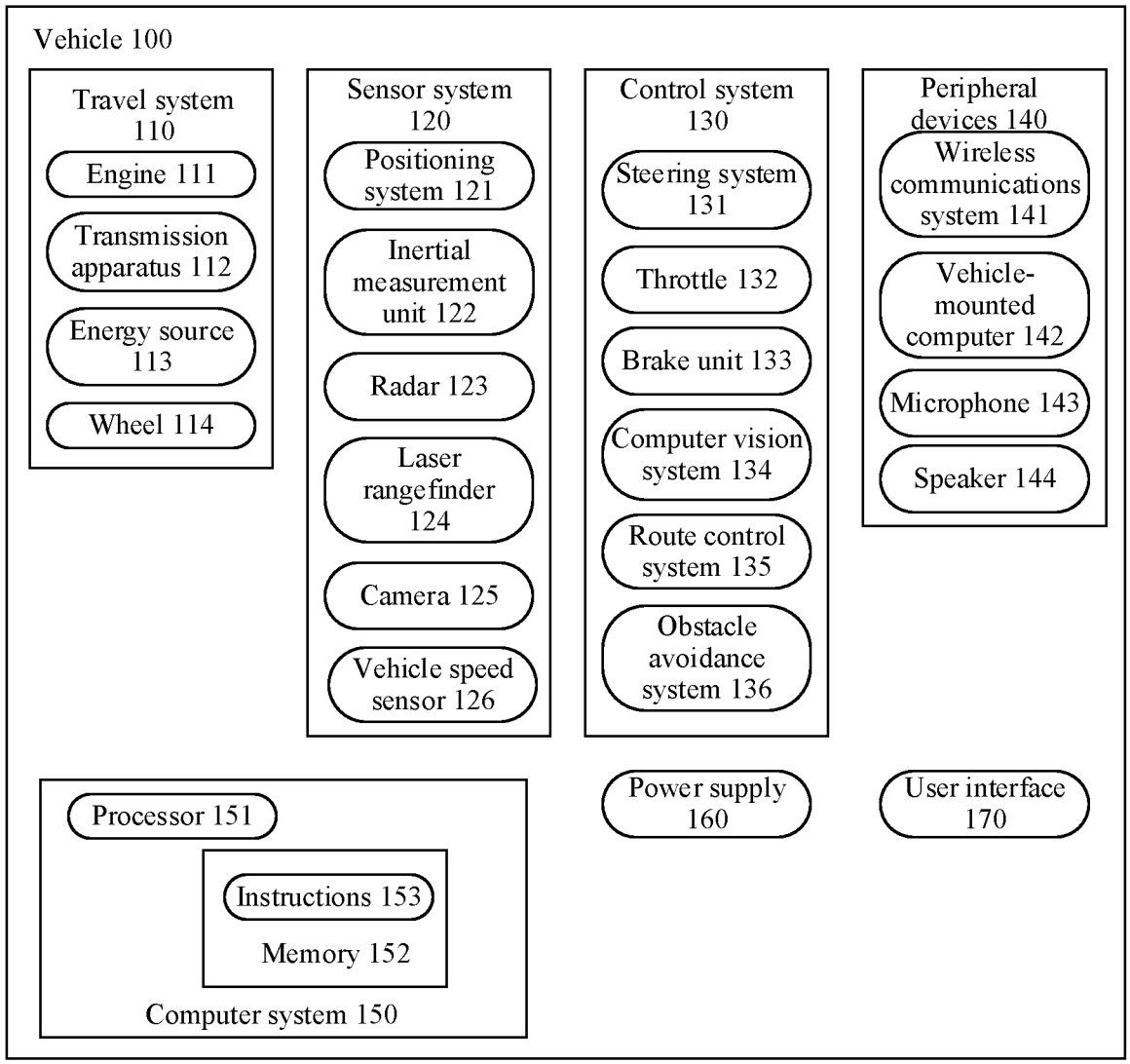
FIG. 1 is a functional block diagram of a vehicle to which an embodiment of this application is applicable.

FIG. 1 is a functional block diagram of a vehicle to which an embodiment of this application is applicable. The vehicle 100 may be a manually driven vehicle, or the vehicle 100 may be configured in a fully or partially autonomous driving mode.

For example, the vehicle 100 can control itself when in an autonomous driving mode, and through manual operations, can determine current states of the vehicle and an ambient environment of the vehicle, determine possible behavior of at least one another vehicle in the ambient environment, determine a confidence level corresponding to a possibility that another vehicle performs the possible behavior, and control the vehicle 100 based on determined information. When the vehicle 100 is in the autonomous driving mode, the vehicle 100 may be set to operate without interacting with a person.

The vehicle 100 may include various subsystems, such as a travel system 110, a sensor system 120, and a control system 130, one or more peripheral devices 140, a power supply 160, a computer system 150, and a user interface 170. Optionally, the vehicle 100 may include more or less subsystems, and each subsystem may include a plurality of elements. In addition, each subsystem and component of the vehicle 100 may be interconnected in a wired or wireless manner.

For example, the travel system 110 may include a component for providing power motion to the vehicle 100. In one embodiment, the travel system 110 may include an engine 111, a transmission apparatus 112, an energy source 113, and a wheel/tire 114. The engine 111 may be an internal combustion engine, a motor, an air compression engine, or a combination of other types of engines, for example, a hybrid engine formed by a gasoline engine and a motor, or a hybrid engine formed by an internal combustion engine and an air compression engine. The engine 111 may convert the energy source 113 into mechanical energy.

For example, the energy source 113 includes gasoline, diesel, another oil-based fuel, propane, another compressed-gas-based fuel, ethanol, a solar panel, a battery, and another power source. The energy source 113 may also provide energy to another system of the vehicle 100.

For example, the transmission apparatus 112 may include a gearbox, a differential, and a drive shaft, wherein the transmission apparatus 112 may transmit the mechanical power from the engine 111 to the wheel 114.

In an embodiment, the transmission apparatus 112 may further include another device, for example, a clutch. The drive shaft may include one or more shafts that may be coupled to one or more wheels 114.

For example, the sensor system 120 may include several sensors that sense information about an ambient environment of the vehicle 100.

For example, the sensor system 120 may include a positioning system 121 (for example, Global Positioning System (GPS), a BEIDOU system, or another positioning system), an inertial measurement unit (IMU) 122, a radar 123, a laser rangefinder 124, a camera 125, and a vehicle speed sensor 126. The sensor system 120 may further include sensors (for example, an in-vehicle air quality monitor, a fuel gauge, and an oil temperature gauge) of an internal system of the monitored vehicle 100. Sensor data from one or more of these sensors can be used to detect an object and corresponding features (a position, a shape, a direction, a speed, and the like) of the object. Such detection and recognition are key functions of a safe operation of the autonomous vehicle 100.

The positioning system 121 may be configured to estimate a geographical location of the vehicle 100. The IMU 122 may be configured to sense a location and an orientation change of the vehicle 100 based on inertial acceleration. In an embodiment, the IMU 122 may be a combination of an accelerometer and a gyroscope.

For example, the radar 123 may sense an object in an ambient environment of the vehicle 100 by using radio information. In some embodiments, in addition to sensing the object, the radar 123 can be further configured to sense a speed and/or an advancing direction of the object.

For example, the laser rangefinder 124 may use laser light to sense an object in an environment in which the vehicle 100 is located. In some embodiments, the laser rangefinder 124 may include one or more laser sources, a laser scanner, one or more detectors, and another system component.

For example, the camera 125 may be configured to capture a plurality of images of the ambient environment of the vehicle 100. For example, the camera 125 may be a static camera or a video camera.

For example, the vehicle speed sensor 126 may be configured to measure a speed of the vehicle 100. For example, a real-time speed test can be performed on a vehicle. The measured vehicle speed may be transferred to the control system 130 to implement control of the vehicle.

As shown in FIG. 1, the control system 130 controls operations of the vehicle 100 and components of the vehicle 100. The control system 130 may include various elements, such as a steering system 131, a throttle 132, a brake unit 133, a computer vision system 134, a route control system 135, and an obstacle avoidance system 136.

For example, the steering system 131 may be operated to adjust an advancing direction of the vehicle 100. For example, in an embodiment, the steering system may be a steering wheel system. The throttle 132 may be configured to control an operation speed of the engine 111 and thus control a speed of the vehicle 100.

For example, the brake unit 133 may be configured to control the vehicle 100 to decelerate, and the brake unit 133 may use friction force to slow down the wheel 114. In another embodiment, the brake unit 133 may convert kinetic energy of the wheel 114 into a current. The brake unit 133 may also slow down a rotational speed of the wheel 114 to control the speed of the vehicle 100.

As shown in FIG. 1, the computer vision system 134 may be operated to process and analyze images captured by the camera 125 in order to identify objects and/or features in the ambient environment of the vehicle 100. The object and/or the feature may include traffic information, a road boundary, and an obstacle. The computer vision system 134 may use an object recognition algorithm, a structure from motion (SFM) algorithm, video tracking, and another computer vision technology. In some embodiments, the computer vision system 134 may be configured to: draw a map for an environment, track an object, estimate a speed of the object, and the like.

For example, the route control system 135 may be configured to determine a driving route of the vehicle 100. In some embodiments, the route control system 135 may determine a driving route for the vehicle 100 with reference to data from the sensors, the GPS, and one or more predetermined maps.

As shown in FIG. 1, the obstacle avoidance system 136 may be used to identify, evaluate, and avoid or otherwise to cross potential obstacles in an environment of the vehicle 100.

In an instance, the control system 130 may additionally or alternatively include components other than those shown and described. Alternatively, the control system 130 may delete some of the components shown above.

As shown in FIG. 1, the vehicle 100 may interact with an external sensor, another vehicle, another computer system, or a user by using the peripheral device 140. The peripheral device 140 may include a wireless communications system 141, a vehicle-mounted computer 142, a microphone 143, and/or a speaker 144.

In some embodiments, the peripheral device 140 may provide a means for the vehicle 100 to interact with the user interface 170. For example, the vehicle-mounted computer 142 may provide information for the user of the vehicle 100. The user interface 116 may also be configured to operate the vehicle-mounted computer 142 to receive a user input, and the vehicle-mounted computer 142 can be operated through a touchscreen. In another case, the peripheral device 140 may provide a means for the vehicle 100 to communicate with another device in the vehicle. For example, the microphone 143 may receive audio (for example, a voice command or another audio input) from the user of the vehicle 100. Likewise, the speaker 144 may output audio to the user of the vehicle 100.

As shown in FIG. 1, the wireless communications system 141 may communicate wirelessly with one or more devices directly or through a communications network. For example, the wireless communications system 141 may use 3G cellular communications such as code-division multiple access (CDMA), EVD0, a Global System for Mobile Communications (GSM)/a general packet radio service (GPRS), fourth generation (4G) cellular communications such as Long-Term Evolution (LTE), or fifth generation (5G) cellular communications. The wireless communications system 141 may communicate with a wireless local area network (WLAN) by using wireless Internet access (WIFI).

In some embodiments, the wireless communications system 141 may directly communicate with a device by using an infrared link, Bluetooth, or ZIGBEE protocol. Other wireless protocols, such as various vehicle communications systems, for example, the wireless communications system 141, may include one or more dedicated short-range communications (DSRC) devices which may include public and/or private data communications between vehicles and/or roadside stations.

As shown in FIG. 1, the power supply 160 may provide power to various components of the vehicle 100. In an embodiment, the power supply 160 may be a rechargeable lithium-ion or lead-acid battery. One or more battery packs of such a battery may be configured as the power supply to supply power to the components of the vehicle 100. In some embodiments, the power supply 160 and the energy source 113 may be implemented together, as in some battery electric vehicles.

For example, some or all of the functions of the vehicle 100 may be controlled by the computer system 150, where the computer system 150 may include at least one processor 151, and the processor 151 executes instructions 153 stored in, for example, a non-transient computer-readable medium in a memory 152. The computer system 150 may alternatively be a plurality of computing devices that control individual components or subsystems of the vehicle 100 in a distributed manner.

For example, the processor 151 may be any conventional processor, like a commercially available central processing unit (CPU).

Optionally, the processor may be a dedicated device of an application-specific integrated circuit (ASIC) or another hardware-based processor. Although FIG. 1 functionally illustrates the processor, the memory, and other elements of a computer in a same block, a person of ordinary skill in the art should understand that the processor, the computer, or the memory may actually include a plurality of processors, computers, or memories that may or may not be stored in a same physical housing. For example, the memory may be a hard disk drive or another storage medium located in a housing different from that of the computer. Thus, it is understood that a reference to the processor or the computer includes a reference to a set of processors or computers or memories that may or may not operate in parallel. Different from using a single processor to perform the steps described herein, some components such as a steering component and a deceleration component may include respective processors. The processor performs only computation related to a component-specific function.

In various aspects described herein, the processor may be located far away from the vehicle and wirelessly communicate with the vehicle. In another aspect, some processes described herein are performed on a processor disposed inside the vehicle, while others are performed by a remote processor, including performing steps necessary for single manipulation.

In some embodiments, the memory 152 may include instructions 153 (for example, program logic), and the instructions 153 may be used by the processor 151 to perform various functions of the vehicle 100, including the functions described above. The memory 152 may also include additional instructions, for example, instructions for sending data to, receiving data from, interacting with, and/or controlling one or more of the travel system 110, the sensor system 120, the control system 130, and the peripheral device 140.

For example, in addition to the instructions 153, the memory 152 may also store data, such as road maps, route information, locations, directions, and speeds of the vehicle and other such vehicle data, as well as other information. Such information may be used by the vehicle 100 and the computer system 150 during operation of the vehicle 100 in autonomous, semi-autonomous, and/or manual modes.

As shown in FIG. 1, the user interface 170 may be configured to provide information to or receive information from the user of the vehicle 100. Optionally, the user interface 170 may be included in one or more input/output devices in a set of the peripheral devices 140, for example, the wireless communications system 141, the vehicle-mounted computer 142, the microphone 143, and the speaker 144.

In this embodiment of this application, the computer system 150 may control the functions of the vehicle 100 based on inputs received from various subsystems (for example, the travel system 110, the sensor system 120, and the control system 130) and the user interface 170. For example, the computer system 150 may use an input from the control system 130 to control the brake unit 133 to avoid an obstacle that is detected by the sensor system 120 and the obstacle avoidance system 136. In some embodiments, the computer system 150 is operated to provide control over many aspects of the vehicle 100 and the subsystems of vehicle.

Optionally, one or more of the foregoing components may be installed separately from or associated with the vehicle 100. For example, the memory 152 may exist partially or completely separate from the vehicle 100. The foregoing components may be communicatively coupled together in a wired and/or wireless manner.

Optionally, the foregoing components are merely examples. During actual application, components in the foregoing modules may be added or removed based on an actual requirement. FIG. 1 should not be construed as a limitation on this embodiment of this application.

Optionally, the vehicle 100 may be an autonomous vehicle traveling on a road and may identify an object in the ambient environment of the vehicle, to determine to adjust a current speed. The object may be another vehicle, a traffic control device, or another type of object. In some examples, each recognized object may be considered independently and may be used to determine the speed to be adjusted by the autonomous vehicle, based on features of each object, such as a current speed of the object, acceleration of the object, or a spacing between the object and the car.

Optionally, the vehicle 100 or a computing device (for example, the computer system 150, the computer vision system 134, or the memory 152 of FIG. 1) associated with the vehicle 100 may predict a behavior of the recognized object based on the characteristics of the recognized object and a state (for example, traffic, rain, or ice on a road) of the ambient environment.

Optionally, the recognized objects depend on behavior of each other. Therefore, all the recognized objects may be considered together to predict behavior of a single recognized object. The vehicle 100 can adjust the speed of the vehicle 100 based on the predicted behavior of the identified object. In other words, the autonomous vehicle can determine, based on the predicted behavior of the object, that the vehicle needs to be adjusted (for example, acceleration, deceleration, or stop) to a stable state. In this process, another factor may also be considered to determine the speed of the vehicle 100, for example, a horizontal location of the vehicle 100 on a road on which the vehicle travels, curvature of the road, and proximity between a static object and a dynamic object.

In addition to providing instructions for adjusting the speed of the autonomous vehicle, the computing device may further provide instructions for modifying a steering angle of the vehicle 100, so that the autonomous vehicle can follow a given track and/or maintain safe horizontal and vertical distances from an object (for example, a car in a neighboring lane on the road) near the autonomous vehicle.

The vehicle 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not limited in this embodiment of this application.

In a possible implementation, the vehicle 100 shown in FIG. 1 may be an autonomous vehicle. The following describes an autonomous driving system in detail.

Figure 2:
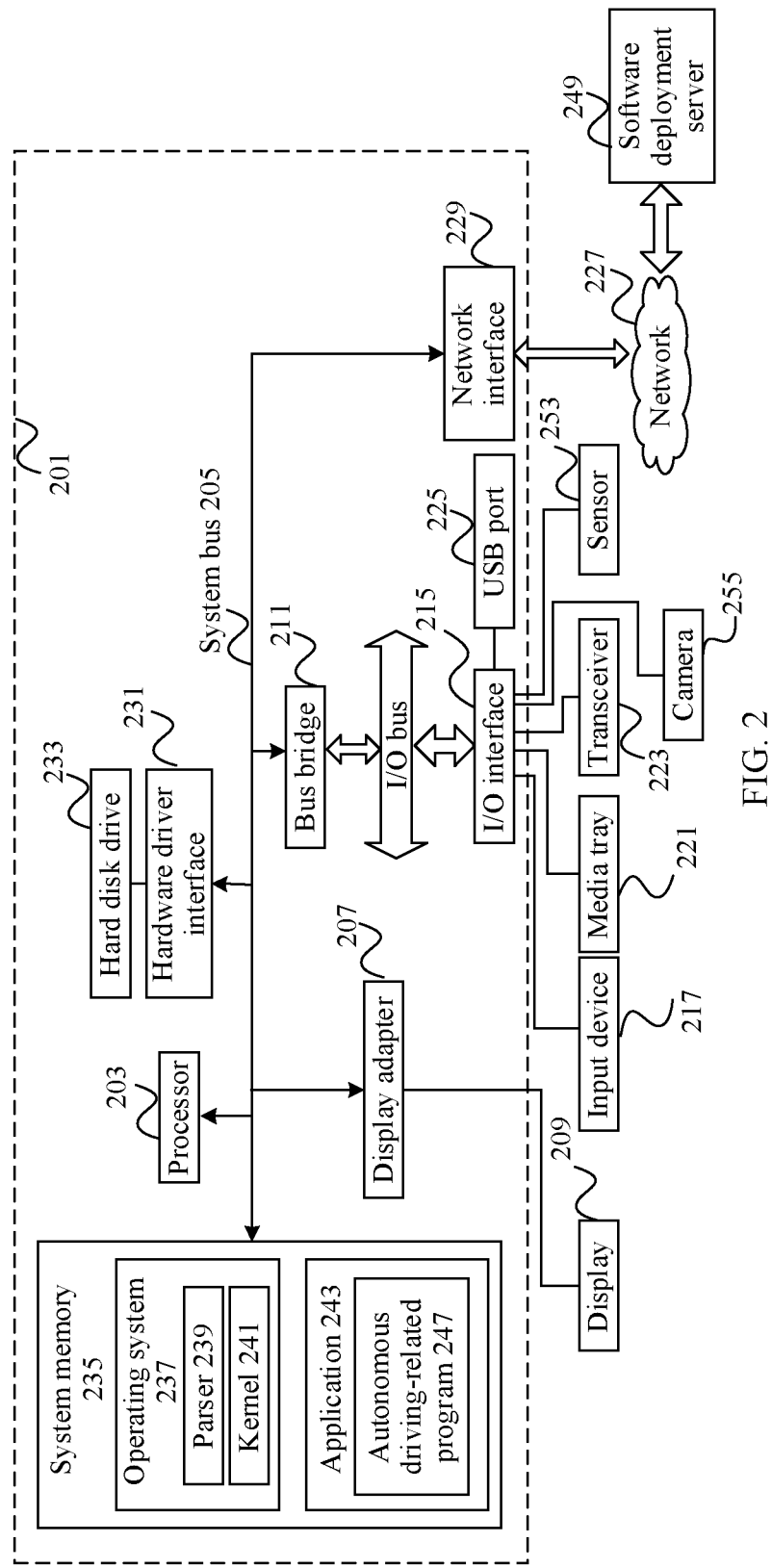
FIG. 2 is a schematic diagram of an autonomous driving system to which an embodiment of this application is applicable.

FIG. 2 is a schematic diagram of an autonomous driving system to which an embodiment of this application is applicable. The autonomous driving system shown in FIG. 2 includes a computer system 201. The computer system 201 includes a processor 203, and the processor 203 is coupled to a system bus 205. The processor 203 may be one or more processors, and each processor may include one or more processor cores. A display adapter (video adapter) 207 may drive a display 209, and the display 209 is coupled to the system bus 205. The system bus 205 may be coupled to an input/output (I/O) bus 213 by using a bus bridge 211, and an I/O interface 215 is coupled to the I/O bus. The I/O interface 215 communicates with a plurality of I/O devices, such as an input device 217 (for example, a keyboard, a mouse, or a touchscreen) and a media tray 221 (for example, a CD-ROM or a multimedia interface). The transceiver 223 may send and/or receive radio communication information, and a camera 255 may capture static and dynamic digital video images. An interface connected to the I/O interface 215 may be a Universal Serial Bus (USB) port 225.

The processor 203 may be any conventional processor, for example, a reduced instruction set computing (RISC) processor, a complex instruction set computing (CISC) processor, or a combination thereof.

Optionally, the processor 203 may be a dedicated apparatus, for example, an ASIC. The processor 203 may be a neural network processor or a combination of the neural network processor and the foregoing conventional processor.

Optionally, in some embodiments, the computer system 201 may be located far away from an autonomous vehicle, and may wirelessly communicate with the autonomous vehicle. In other aspects, some of the processes described in this application are performed on a processor disposed inside the autonomous vehicle, and others are performed by a remote processor, including taking actions required to perform a single operation.

The computer system 201 may communicate with a software deployment server 249 through a network interface 229. The network interface 229 is a hardware network interface, for example, a network interface card. A network 227 may be an external network, for example, the Internet, or may be an internal network, for example, an Ethernet or a virtual private network (VPN). Optionally, the network 227 may alternatively be a wireless network, for example, a WIFI network or a cellular network.

As shown in FIG. 2, a hard disk drive interface is coupled to the system bus 205, a hardware driver interface 231 may be connected to a hard disk drive 233, and a system memory 235 is coupled to the system bus 205. Data running in the system memory 235 may include an operating system 237 and an application 243. The operating system 237 may include a shell 239 and a kernel 241. The shell 239 is an interface between a user and the kernel of the operating system. The shell may be the outermost layer of the operating system. The shell can manage interactions between the user and the operating system, such as waiting for a user input, interpreting the user input to the operating system, and processing a variety of output results of operating system. The kernel 241 may include components in the operating system that are configured to manage a memory, a file, a peripheral device, and a system resource. The kernel directly interacts with hardware. The kernel of the operating system usually runs processes, provides communication between the processes, and provides CPU time slice management, interruption, memory management, I/O management, and the like. The application 243 includes programs for controlling autonomous driving of the vehicle, for example, a program that manages interaction between the autonomous vehicle and a road obstacle, a program that controls a route or a speed of the autonomous vehicle, a program that controls interaction between the autonomous vehicle and another autonomous vehicle on a road. The application 243 also exists on a system of the software deployment server 249. In an embodiment, the computer system 201 may download the application from the software deployment server 249 when an autonomous driving-related program 247 needs to be executed.

For example, the application 243 may alternatively be a program for the autonomous vehicle to interact with a lane line on the road, in other words, the application is a program that can track the lane line in real time.

For example, the application 243 may alternatively be a program that controls the autonomous vehicle to perform automatic parking.

For example, a sensor 253 may be associated with the computer system 201, and the sensor 253 may be configured to detect an ambient environment of the computer system 201.

For example, the sensor 253 may detect a lane on the road, for example, may detect a lane line, and can track, in real time, a lane line change in a specific range in front of the vehicle in a process of moving (for example, being driven). For another example, the sensor 253 may detect an animal, an automobile, an obstacle, a pedestrian crosswalk, and the like. Further, the sensor may detect ambient environments of the foregoing objects such as the animal, the automobile, the obstacle, and the pedestrian crosswalk. For example, the sensor may detect the ambient environment of the animal including another animal that appears around the animal, a weather condition, and brightness of the ambient environment.

Optionally, if the computer system 201 is located on the autonomous vehicle, the sensor may be a camera lens, an infrared sensor, a chemical detector, a microphone, or the like.

For example, in a lane line tracking scenario, the sensor 253 may be configured to detect a lane line in front of the vehicle, so that the vehicle can sense a lane change in a traveling process, to perform real-time planning and adjustment on driving of the vehicle based on the lane change.

For example, in an automatic parking scenario, the sensor 253 may be configured to detect sizes or locations of a packing place around the vehicle and a surrounding obstacle, so that the vehicle can sense a distance between the packing place and the surrounding obstacle, and perform collision detection during parking, to prevent the vehicle from colliding with the obstacle.

In an example, the computer system 150 shown in FIG. 1 may also receive information from or transfer information to another computer system. Alternatively, sensor data collected from the sensor system 120 of the vehicle 100 may be transferred to another computer for processing, and FIG. 3 is used as an example below for description.

Figure 3:
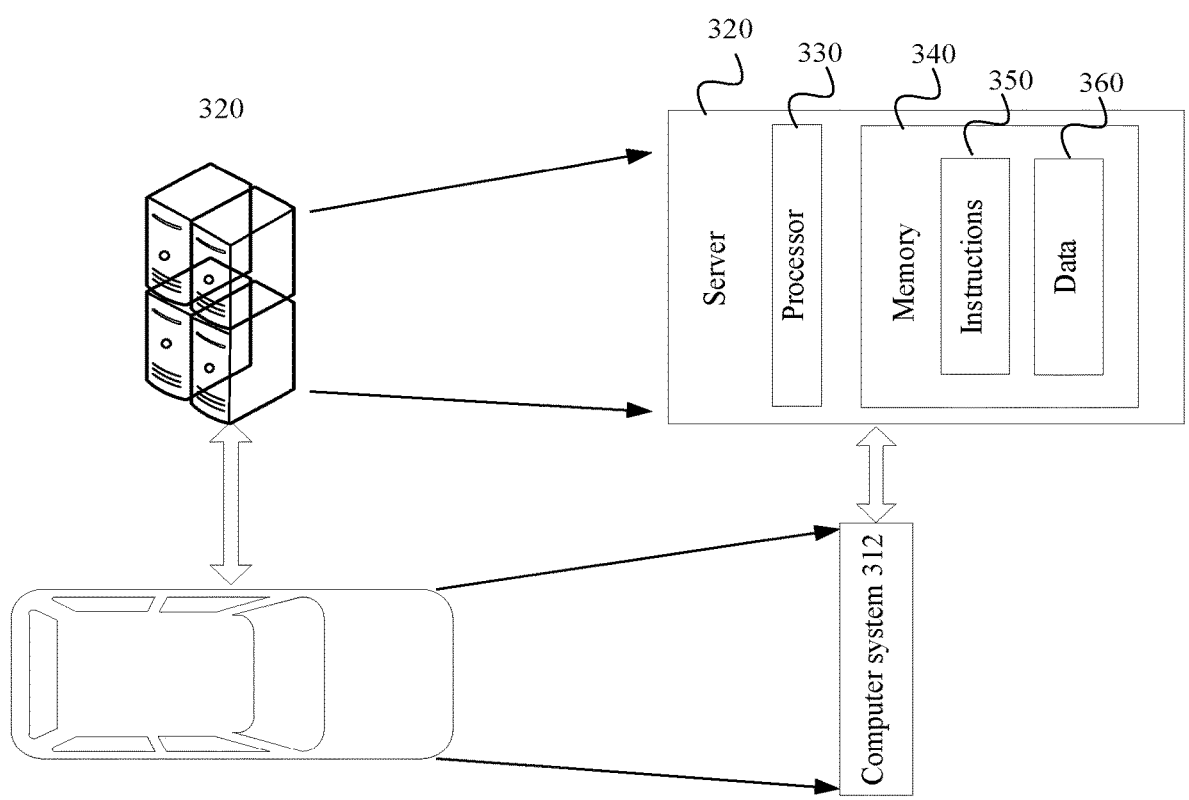
FIG. 3 is a schematic diagram of application of a cloud-instructed autonomous vehicle according to an embodiment of this application.

FIG. 3 is a schematic diagram of application of a cloud-instructed autonomous vehicle according to an embodiment of this application. As shown in FIG. 3, data from a computer system 312 may be transferred to a cloud-side server 320 through a network for further processing. The network and an intermediate node may include various configurations and protocols, such as the Internet, the World Wide Web, an intranet, a virtual private network, a wide area network, a local area network, a private network using proprietary communication protocols of one or more companies, Ethernet, WIFI, Hypertext Transfer Protocol (HTTP), and various combinations thereof. Through such communication, data may be transferred to another computer and transferred from another computer to any device like a modem and a wireless interface.

In an example, the server 320 may include a server like a load balancing server cluster including a plurality of computers, and exchanges information with different nodes of the network for the purpose of receiving, processing, and transmitting data from the computer system 312. The server may be configured similarly to the computer system 312, which has a processor 330, a memory 340, instructions 350, and data 360.

For example, the data 360 of the server 320 may include information related to road conditions around a vehicle. For example, the server 320 may receive, detect, store, update, and transmit information related to road conditions around the vehicle.

For example, the information related to the road conditions around the vehicle includes information about other vehicles and information about obstacles around the vehicle.

A current electronic mechanical braking system does not have a redundancy control function, that is, only one control unit is available. Therefore, when the control unit fails, the electronic mechanical braking system completely loses a braking capability, which brings about a serious safety risk. In addition, a conventional electronic mechanical braking system does not set an active control policy for scenarios such as a slipping, turning, or autonomous driving of a vehicle, and therefore has poor drivability and stability.

To resolve the foregoing problem, an embodiment of this application provides a new electronic mechanical braking apparatus. The braking apparatus includes a plurality of control units. Therefore, when one of the control units fails, the rest of the control units may be further used to continue control, to implement redundant braking, effectively improve a braking control effect, and improve vehicle control safety. In addition, functions such as anti-slip control, turning control, and automatic control are added, to further improve vehicle control safety.

Figure 4:
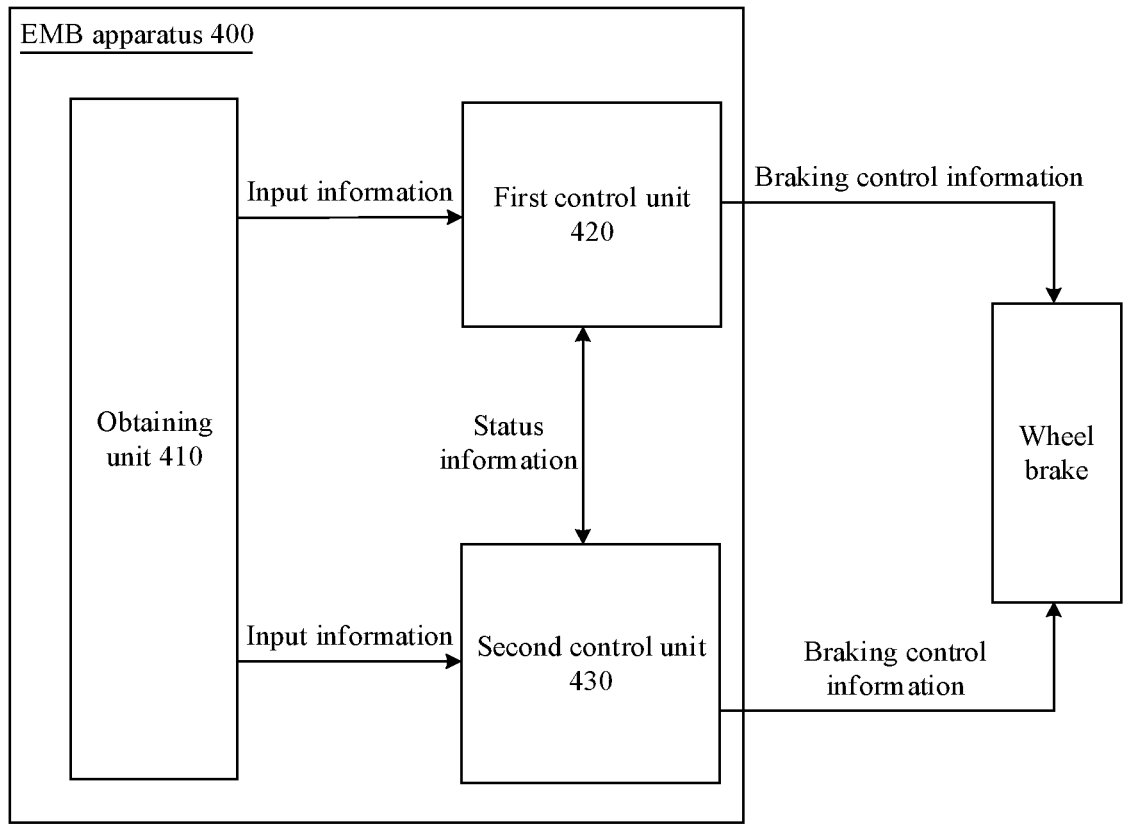
FIG. 4 is a schematic diagram of an electronic mechanical braking apparatus according to an embodiment of this application.

FIG. 4 is a schematic diagram of an electronic mechanical braking apparatus according to an embodiment of this application. As shown in FIG. 4, an EMB apparatus 400 includes an obtaining unit 410, a first control unit 420, and a second control unit 430.

The obtaining unit 410 is configured to obtain input information, where the input information may include one or more of the following: power supply information, ignition information, wheel speed information, vehicle speed information, acceleration information, pedal information, steering angle information, yaw velocity information, braking requirement information, or the like.

The input information may be transmitted to the first control unit 420 and/or to the second control unit 430.

Both the first control unit 420 and the second control unit 430 may be configured to process the input information, to generate braking control information, to implement braking control on the vehicle. The first control unit 420 and the second control unit 430 may transmit status information to each other, where the status information is used to indicate whether the control unit works normally.

Optionally, the status information may be sent only when a working status changes.

Optionally, the first control unit 420 may be set as a primary control unit, and the second control unit 430 may be set as a secondary control unit. When the first control unit 420 can work normally, the first control unit 420 is used for control. When the first control unit 420 cannot work normally, the second control unit 430 is used for control.

The first control unit 420 and the second control unit 430 may transmit the generated braking control information to a brake at a wheel, and the wheel brake provides braking force for the wheel based on the braking control information.

Optionally, the first control unit 420 and the second control unit 430 may directly generate a braking parameter, for example, parameters such as an operating current, an operating voltage, and power of the brake, so that the brake may directly work based on the received braking parameter, to provide corresponding braking force for the wheel.

For example, a braking process of the EMB may be considered as follows: determining a target braking torque of the vehicle based on a degree of treading a braking pedal (a stroke of the braking pedal), calculating a motor target current based on the target braking torque, and driving a motor to tighten a braking plate based on the motor target current, to implement vehicle braking. In this case, it is equivalent to that the input information obtained by the obtaining unit 410 includes the stroke of the braking pedal, and the braking control information generated by the first control unit 420 or the second control unit 430 based on the stroke of the pedal includes the target current of the motor (that is, an example of the braking parameter).

It should be noted that, an embodiment of this application mainly provides an EMB apparatus including a plurality of control units to implement redundancy control on a vehicle. Therefore, a specific quantity of control units is not limited. To some extent, a larger quantity of control units indicates higher safety. However, it should be understood that the control units occupy large storage space and a large amount of computing resources. An excessive large quantity of control units may be adverse to vehicle control. Therefore, an appropriate quantity of control units may be selected based on limitations including a safety requirement of the vehicle and hardware and software conditions such as storage space and computing resources in the vehicle. FIG. 4 is merely an example in which two control units are included, and a quantity of control units may alternatively be any integer greater than 2.

Optionally, one of a plurality of control units may be selected as a primary control unit, and the other control units are all secondary control units.

Optionally, priority sorting may be further performed on the plurality of control units, and a control unit with a highest priority is first used. When the control unit with the highest priority cannot work normally, a control unit with a second highest priority is selected, and so on, until a control unit that can work normally is found.

In such a manner of performing redundancy control by using a plurality of control units, a control failure caused when a single control unit fails is avoided, to effectively improve a control effect of braking control and improve safety of a vehicle.

Figure 5:
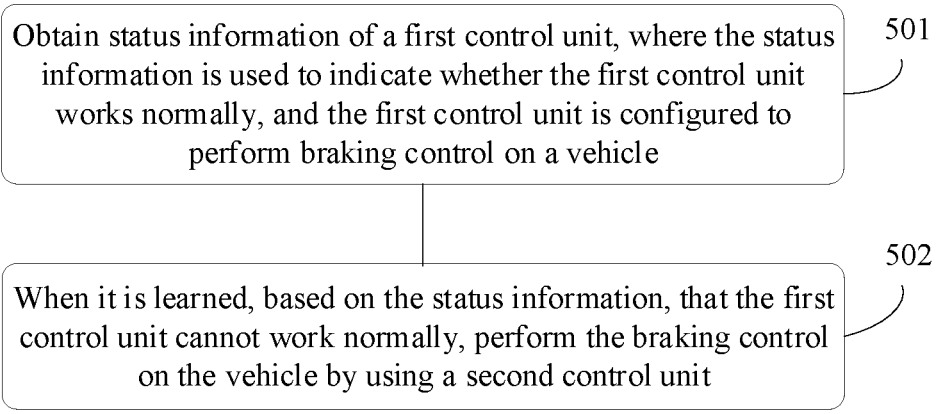
FIG. 5 is a schematic flowchart of an electronic mechanical braking method according to an embodiment of this application.

FIG. 5 is a schematic flowchart of an electronic mechanical braking method according to an embodiment of this application. The following describes steps shown in FIG. 5.

501: Obtain status information of a first control unit, where the status information is used to indicate whether the first control unit works normally, and the first control unit is configured to perform braking control on a vehicle.

Optionally, the first control unit may be used as a primary control unit, and by default, the first control unit is configured to perform braking control on the vehicle.

Optionally, the first control unit may obtain, by using the obtaining unit, input information that can affect braking of the vehicle, and process the input information to obtain corresponding braking control information, to control a wheel brake to provide braking force for the vehicle.

Optionally, the input information may include any one or more types of input information described in FIG. 4.

Optionally, the input information may include wheel speed information and vehicle speed information. A vehicle speed (which may be referred to as a first vehicle speed) calculated based on the wheel speed information may be compared with a vehicle speed (which may be referred to as a second vehicle speed) indicated by the vehicle speed information, and a wheel slip ratio is calculated based on a deviation between the two. For details, refer to related descriptions in FIG. 6 and FIG. 7.

Optionally, the foregoing slip ratio may be further compared with a preset slip ratio, so as to determine whether to increase, decrease, or maintain braking force of the wheel. In other words, the braking force may be adjusted based on a difference between the slip ratio and the preset slip ratio, and the adjustment may include increasing, reducing, or maintaining the braking force.

For example, the braking force may be adjusted in the following manner.

When the slip ratio is greater than or equal to a first threshold, the braking control information is used to indicate the wheel brake to increase the braking force; when the slip ratio is less than or equal to a second threshold, the braking control information is used to indicate the wheel brake to reduce the braking force; or when the slip ratio is less than the first threshold and greater than the second threshold, the braking control information is used to indicate the wheel brake not to change the braking force.

Such a manner of adjusting the braking force of the wheel based on the slip ratio (that is, anti-slip control) can ensure stability and driving performance of the vehicle.

The slip ratio may be understood as an offset degree of a wheel speed (that is, the first vehicle speed) relative to a vehicle speed (that is, the second vehicle speed), and may be obtained through calculation by using the vehicle speed and the wheel speed. For example, the slip ratio may satisfy a formula: Slip ratio=(|vehicle speed−wheel speed|)/vehicle speed. However, it should be understood that any other deformed formula equivalent to the formula may also achieve a same technical effect, for example, may be a wheel speed minus a vehicle speed.

In the foregoing anti-slip control process, in a working condition in which the vehicle slips, braking force provided by the wheel brake is controlled, to reduce a slip degree of the vehicle, to improve drive performance and stability performance of the vehicle.

Optionally, the input information may further include the steering angle information and the yaw velocity information. In this case, an expected turning degree may be calculated based on the steering angle information, an actual turning degree of the vehicle may be calculated based on a yaw velocity, and then a deviation between the expected turning degree and the actual turning degree is compared with a preset deviation range, to determine specific braking force that needs to be applied to the vehicle, for example, braking force that needs to be applied to, increased, or decreased on a specific wheel, so that a turning degree of the vehicle is more consistent with the expected turning degree. For details, refer to related descriptions in FIG. 8.

In the foregoing turning control process, when the vehicle performs understeer or oversteer, the vehicle is enabled to return to an ideal track by controlling the braking force of the wheel, so that stable performance of the vehicle can be implemented.

Optionally, the input information may further include braking requirement information. The braking requirement information may be a braking requirement sent by an assisted driving system in assisted driving, or may be a braking requirement sent by an autonomous driving system in autonomous driving. In this case, the braking control information may be generated based on the braking requirement, to implement deceleration control on the vehicle.

In a case of assisted driving and autonomous driving, the braking control information may be automatically generated based on a deceleration requirement, to implement automatic braking control on the vehicle.

502: When it is learned, based on the status information, that the first control unit cannot work normally, perform the braking control on the vehicle by using a second control unit.

Optionally, status information of the first control unit may be obtained. When it is learned, based on the status information, that the first control unit cannot work normally, the second control unit is configured to perform the braking control on the vehicle.

Optionally, for a control method of the second control unit, refer to the control method of the first control unit. Details are not described again.

In the EMB control method shown in FIG. 5, EMB control is implemented by using a plurality of control units. Therefore, when one of the control units fails, the rest of the control units may be further used to continue control, to implement redundant braking, effectively improve a braking control effect, and improve vehicle control safety.

In addition, anti-slip control, turning control, automatic control, and the like of the vehicle are further improved, to further improve the braking control effect and further improve the vehicle control safety.

Figure 6:
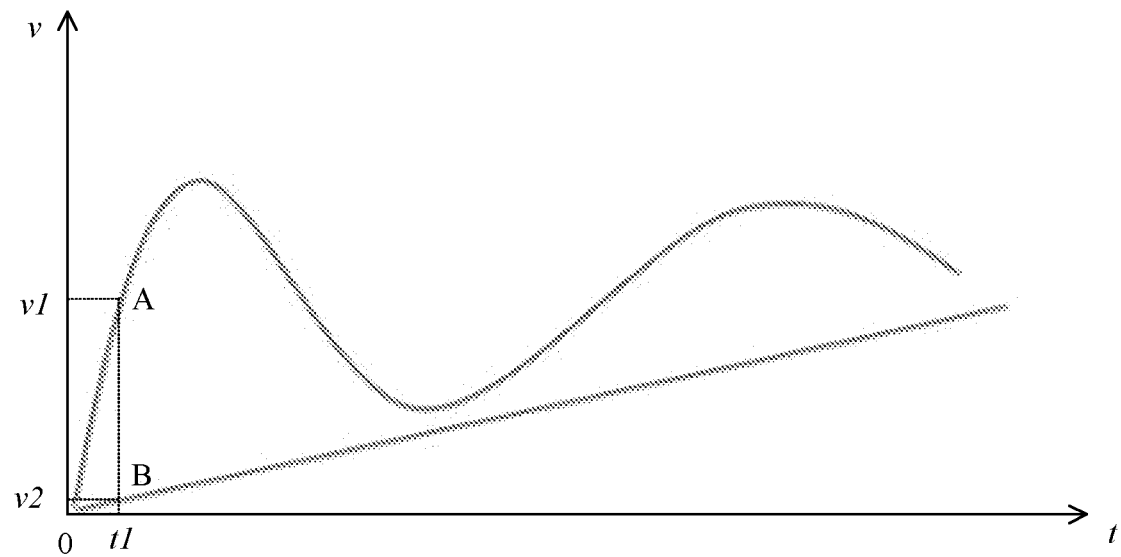
FIG. 6 is a schematic diagram of comparison between a wheel speed change trend and a vehicle speed change trend.

FIG. 6 is a schematic diagram of comparison between a wheel speed change trend and a vehicle speed change trend. As shown in FIG. 6, a horizontal coordinate axis of the coordinate system represents time t, and a vertical coordinate axis represents a speed v. A specific measurement unit used for the speed is not limited, for example, may be meter/second, or may be kilometer/hour.

A straight line in FIG. 6 represents a change curve of a vehicle speed (that is, the foregoing second vehicle speed) measured by a vehicle speed sensor, and a curve line in FIG. 6 represents a vehicle speed (that is, the foregoing first vehicle speed) calculated by using a wheel speed (a wheel rotating speed). For example, it is assumed that the wheel speed is N circles/second, and a wheel circumference is L meters, the vehicle speed may be calculated as N×L meters/second, where N is an integer, and L is a real number.

$A(t1, v1)$ and $B(t1, v2)$ in FIG. 6 respectively represent coordinates formed by the second vehicle speed and the first vehicle speed at a moment t1, that is, in FIG. 6, the first vehicle speed at the moment t1 is v1, and the second vehicle speed at the moment t1 is v2. Therefore, a slip ratio at the moment t1 may be calculated as follows: $(v1-v2)/v2$. Based on the same method, slip ratios at all moments can be calculated, and a curve of a slip ratio changing with time can be obtained.

Figure 7:
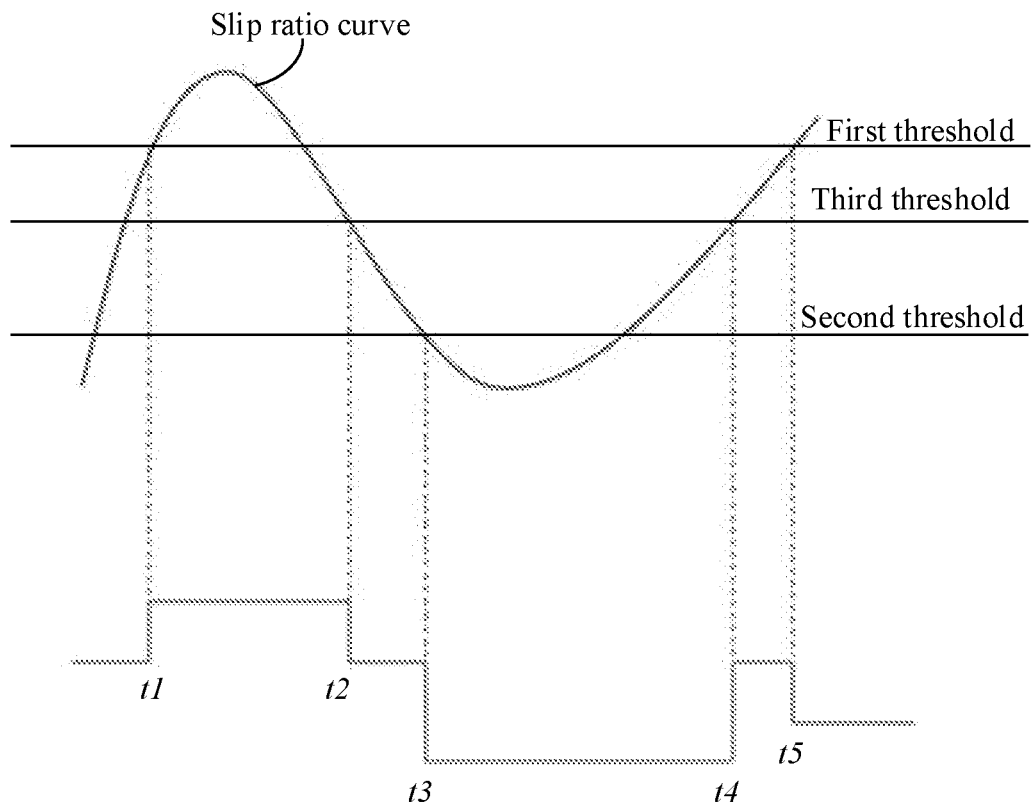
FIG. 7 is a schematic diagram of anti-slip control according to an embodiment of this application.

FIG. 7 is a schematic diagram of anti-slip control according to an embodiment of this application. As shown in FIG. 7, a curve in FIG. 7 represents a curve in which a slip ratio changes with time, and may be referred to as a slip ratio curve. A step line below the slip ratio curve in FIG. 7 is used to represent a change trend of braking force.

Optionally, a threshold may be set for the slip ratio, and the braking force is adjusted based on a relationship between the slip ratio and the threshold.

Optionally, one or more thresholds may be set. For example, any one or more of a first threshold, a second threshold, and a third threshold shown in FIG. 7 may be set.

The first threshold may be used as a threshold for increasing the braking force, that is, when the slip ratio is greater than or equal to the first threshold, the braking force is increased. For example, the braking force may be increased in a time period from t1 to t2 in FIG. 7, and for another example, the braking force may be increased in a time period from t4 to t5 in FIG. 7.

The third threshold may be used as a threshold for maintaining the braking force, that is, when the slip ratio is less than or equal to the third threshold, the braking force is maintained. For example, the braking force may be maintained in a time period from t2 to t3 in FIG. 7.

The second threshold may be used as a threshold for reducing the braking force, that is, when the slip ratio is less than or equal to the second threshold, the braking force is reduced. For example, the braking force may be reduced in a time period from t3 to t4 in FIG. 7.

It should be noted that the first threshold, the second threshold, and the third threshold are merely examples, that is, there is no limitation on action thresholds to which the three thresholds are specifically set. For example, the third threshold may alternatively be used as a threshold for reducing the braking force. In addition, there is no limitation on a specific quantity of thresholds to be set and a correspondence between a threshold and braking force adjustment. Details are not described one by one.

Figure 8:
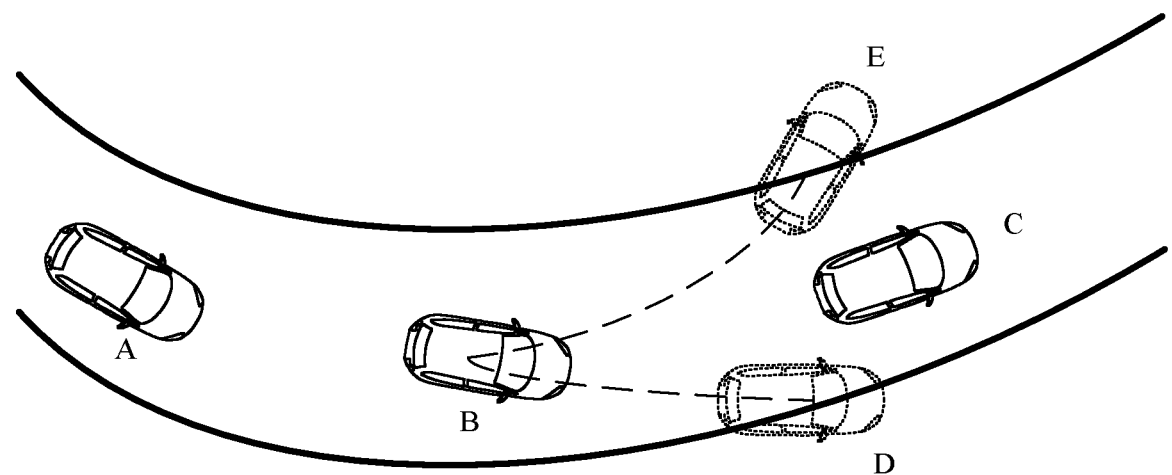
FIG. 8 is a schematic diagram of turning control according to an embodiment of this application.

FIG. 8 is a schematic diagram of turning control according to an embodiment of this application. As shown in FIG. 8, a road is between two bold curve lines, and a vehicle turns and travels on the road. An expected turning degree of the vehicle is a direction of a curve line formed by three points A, B, and C in the figure, but an actual turning degree of the vehicle is a direction of a dashed curve line connecting two points B and D in the figure, or a direction of a dashed curve line connecting two points B and E in the figure. In this case, if no adjustment is performed, traveling of the vehicle may deviate from an expectation.

Optionally, the expected turning degree may be obtained through calculation based on steering angle information, and the actual turning degree may be obtained through calculation based on a yaw velocity of the vehicle.

Optionally, a first deviation between an expected turning curve (an expected turning degree) and an actual turning curve (an actual turning degree) is obtained, and braking force on each wheel is adjusted based on the first deviation, so that an adjusted turning degree of the vehicle can meet the expectation.

Optionally, a threshold may also be set for the first deviation, and the braking force is adjusted based on a relationship between the first deviation and the preset deviation threshold.

Figure 9:
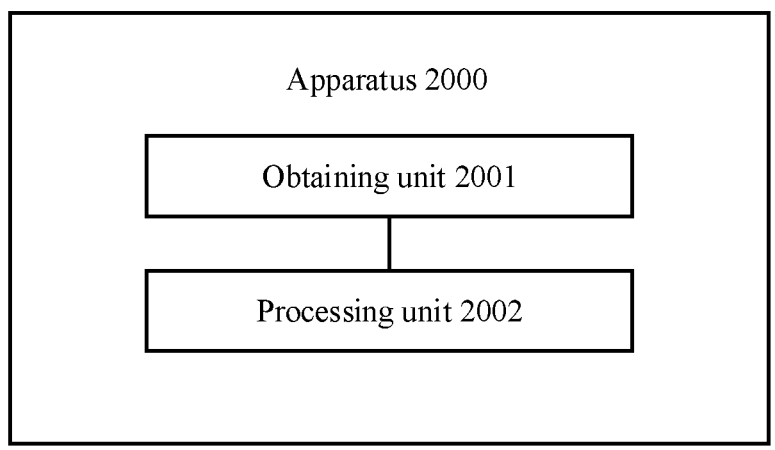
FIG. 9 is a schematic diagram of an EMB apparatus according to an embodiment of this application.

FIG. 9 is a schematic diagram of an EMB apparatus according to an embodiment of this application. The apparatus 2000 includes an obtaining unit 2001 and a processing unit 2002. The apparatus 2000 may be configured to perform steps of the EMB method in embodiments of this application.

For example, the obtaining unit 2001 may be configured to perform step 501 in the method shown in FIG. 5, and the processing unit 2002 may be configured to perform step 502 in the method shown in FIG. 5. For another example, the apparatus 2000 may be further configured to perform the methods for adjusting a braking force shown in FIG. 7 and FIG. 8. The obtaining unit 2001 may be configured to perform a step of obtaining input information. The processing unit 2002 may be configured to perform a step of processing the input information to obtain braking control information. The processing unit 2002 may be further configured to perform a step of controlling, based on the braking control information, a wheel brake to work based on a braking parameter that is set.

Optionally, the apparatus 2000 may correspond to the EMB apparatus 400 shown in FIG. 4, the obtaining unit 2001 may correspond to the obtaining unit 410, and the processing unit 2002 may include a first control unit 420 and a second control unit 430.

Figure 10:
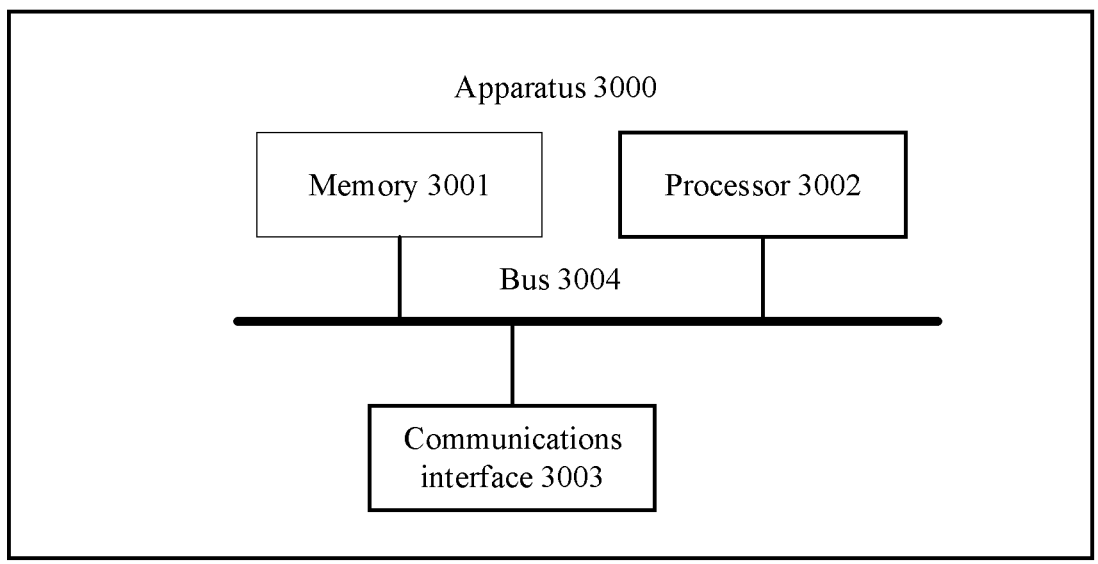
FIG. 10 is a schematic diagram of a hardware structure of an EMB apparatus according to an embodiment of this application.

FIG. 10 is a schematic diagram of a hardware structure of an EMB apparatus according to an embodiment of this application. The apparatus 3000 includes a memory 3001, a processor 3002, a communications interface 3003, and a bus 3004. The memory 3001, the processor 3002, and the communications interface 3003 are communicatively connected to each other through the bus 3004.

The apparatus 3000 may be configured to perform the steps of the foregoing EMB method.

Optionally, the memory 3001 may be a ROM, a static storage device, a dynamic storage device, or a RAM. The memory 3001 may store a program. When the program stored in the memory 3001 is executed by the processor 3002, the processor 3002 and the communications interface 3003 are configured to perform the steps of the EMB method in embodiments of this application.

Optionally, the memory 3001 may have a function of the memory 152 shown in FIG. 1, a function of the system memory 235 shown in FIG. 2, or a function of the memory 340 shown in FIG. 4, to implement the foregoing function of storing the program. Optionally, the processor 3002 may use a general-purpose CPU, a microprocessor, an ASIC, or one or more integrated circuits, and is configured to execute a related program, to implement functions that need to be performed by units in the EMB apparatus in embodiments of this application, or perform steps of the EMB method in embodiments of this application.

Optionally, the processor 3002 may have a function of the processor 151 shown in FIG. 1, a function of the processor 203 shown in FIG. 2, or a function of the processor 330 shown in FIG. 3, to implement the foregoing function of executing the related program.

Optionally, the processor 3002 may alternatively be an integrated circuit chip, and has an information processing capability. In an implementation process, the steps of the EMB method in embodiments of this application may be completed by using an integrated logic circuit of hardware in the processor or instructions in a form of software.

Optionally, the processor 3002 may further be a general purpose processor, a digital information processor (DSP), an ASIC, a field programmable gate array (FPGA) or another programmable logic device, a discrete gate or transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, like a random access memory, a flash memory, a read-only memory, a programmable read-only memory, an electrically erasable programmable memory, or a register. The storage medium is located in the memory. The processor reads information in the memory, and completes, in combination with hardware of the processor, functions that need to be performed by the units included in the EMB apparatus in embodiments of this application, or performs the steps of the EMB method in embodiments of this application.

Optionally, the communications interface 3003 may use a transceiver apparatus, for example, but not limited to, a transceiver, to implement communication between the apparatus and another device or a communications network.

The bus 3004 may include a path for transmitting information between the components (for example, the memory, the processor, and the communications interface) of the apparatus.

In embodiments of this application, "first", "second", and various numeric numbers are merely used for distinguishing for ease of description and are not intended to limit the scope of embodiments of this application. For example, different control units and thresholds are distinguished.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, like a USB flash drive, a removable hard disk, a ROM, a RAM, a magnetic disk, or an optical disc.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for electronic mechanical braking, comprising:
    selecting, based on priority levels of a plurality of control units, a first control unit of the control units as a primary control for braking control of a vehicle during normal operation, wherein the first control unit has a highest priority of the priority levels, and wherein the braking control comprises braking control information based on a slip ratio or a deviation in turning degree;
    selecting, based on the priority levels, a second control unit of the control units as a secondary control for the braking control of the vehicle;
    obtaining status information of the first control unit for the braking control of the vehicle, wherein the status information indicates whether the first control unit works normally; and
    performing the braking control on the vehicle using the second control unit when the status information indicates the first control unit is not working normally.

2. The method of claim 1, further comprising:
    obtaining input information comprising at least one of power supply information, ignition information, wheel speed information, vehicle speed information, acceleration information, pedal information, steering angle information, yaw velocity information, or braking requirement information;
    processing the input information to obtain braking control information, wherein the braking control information indicates a wheel brake of the vehicle; and
    providing a corresponding braking force for a wheel based on the braking control information.

3. The method of claim 2, wherein when the input information comprises the wheel speed information and the vehicle speed information, processing the input information comprises:
    calculating a first speed of the vehicle from the wheel speed information;
    obtaining a second speed of the vehicle from the vehicle speed information;
    obtaining the slip ratio of the vehicle using the first speed and the second speed, wherein the slip ratio indicates an offset degree of the first speed relative to the second speed; and
    generating the braking control information using the slip ratio.

4. The method of claim 3, further comprising generating the braking control information to instruct the wheel brake to increase the braking force when the slip ratio is greater than or equal to a first threshold.

5. The method of claim 2, wherein when the input information comprises steering angle information and the yaw velocity information, processing the input information comprises:
    calculating an expected turning degree using the steering angle information;
    calculating an actual turning degree using the yaw velocity information; and
    obtaining the braking control information using a first deviation of the actual turning degree relative to the expected turning degree.

6. The method of claim 5, further comprising obtaining the braking control information based on a relationship between the first deviation and a preset deviation threshold.

7. An electronic mechanical braking apparatus, comprising:
    one or more processors; and
    a memory configured to store instructions that when executed by the one or more processors cause the electronic mechanical braking apparatus to:
        select, based on priority levels of a plurality of control units, a first control unit of the control units as a primary control for braking control of a vehicle during normal operation, wherein the first control unit has a highest priority of the priority levels, and wherein the braking control comprises braking control information based on a slip ratio or a deviation in turning degree;
        select, based on the priority levels, a second control unit of the control units as a secondary control for the braking control of the vehicle;
        obtain status information of the first control unit, wherein the status information indicates whether the first control unit works normally, and wherein the first control unit is configured to perform the braking control on the vehicle; and
        perform the braking control of the vehicle with the second control unit when the status information indicates that the first control unit is not working normally.

8. The electronic mechanical braking apparatus of claim 7, wherein the instructions that when executed by the one or more processors further cause the electronic mechanical braking apparatus to:
    obtain input information comprising at least one of power supply information, ignition information, wheel speed information, vehicle speed information, acceleration information, pedal information, steering angle information, yaw velocity information, or braking requirement information;
process the input information to obtain braking control information, wherein the braking control information indicates a wheel brake of the vehicle; and
provide a corresponding braking force for a wheel based on the braking control information.

9. The electronic mechanical braking apparatus of claim 8, wherein when the input information comprises the wheel speed information and the vehicle speed information, the instructions when executed by the one or more processors further cause the electronic mechanical braking apparatus to:
calculate a first speed of the vehicle using the wheel speed information;
obtain a second speed of the vehicle from the vehicle speed information;
obtain the slip ratio of the vehicle using the first speed and the second speed, wherein the slip ratio indicates an offset degree of the first speed relative to the second speed; and
generate the braking control information using the slip ratio.

10. The electronic mechanical braking apparatus of claim 9, wherein the instructions when executed by the one or more processors further cause the electronic mechanical braking apparatus to generate the braking control information to instruct the wheel brake to reduce the braking force when the slip ratio is less than or equal to a second threshold.

11. The electronic mechanical braking apparatus of claim 8, wherein when the input information comprises the steering angle information and the yaw velocity information, the instructions when executed by the one or more processors further cause the electronic mechanical braking apparatus to:
calculate an expected turning degree using the steering angle information;
calculate an actual turning degree using the yaw velocity information; and
obtain the braking control information using a first deviation of the actual turning degree relative to the expected turning degree.

12. The electronic mechanical braking apparatus of claim 11, wherein the instructions when executed by the one or more processors further cause the electronic mechanical braking apparatus to obtain the braking control information based on a relationship between the first deviation and a preset deviation threshold.

13. The electronic mechanical braking apparatus of claim 7, wherein the instructions that when executed by the one or more processors further cause the electronic mechanical braking apparatus to obtain the status information when a working status of the first control unit is changed.

14. A computer program product comprising instructions that are stored on a non-transitory computer readable medium and that, when executed by one or more processors, cause an electronic mechanical braking apparatus to:
select, based on priority levels of a plurality of control units, a first control unit of the control units as a primary control for braking control of a vehicle during normal operation, wherein the first control unit has a highest priority of the priority levels, and wherein the braking control comprises braking control information based on a slip ratio or a deviation in turning degree;
select, based on the priority levels, a second control unit of the control units as a secondary control for the braking control of the vehicle;
obtain status information of the first control unit, wherein the status information indicates whether the first control unit works normally, and wherein the first control unit is configured to perform braking control on a vehicle; and
perform the braking control of the vehicle using the second control unit when the status information indicates that the first control unit is not working normally.

15. The computer program product of claim 14, wherein the instructions when executed by the one or more processors further cause the electronic mechanical braking apparatus to:
obtain input information comprising at least one of power supply information, ignition information, wheel speed information, vehicle speed information, acceleration information, pedal information, steering angle information, yaw velocity information, or braking requirement information;
process the input information to obtain braking control information, wherein the braking control information indicates a wheel brake of the vehicle; and
provide a corresponding braking force for a wheel based on the braking control information.

16. The computer program product of claim 15, wherein when the input information comprises the wheel speed information and the vehicle speed information, the instructions when executed by the one or more processors further cause the electronic mechanical braking apparatus to:
calculate a first speed of the vehicle using the wheel speed information;
obtain a second speed of the vehicle from the vehicle speed information;
obtain the slip ratio of the vehicle using the first speed and the second speed, wherein the slip ratio indicates an offset degree of the first speed relative to the second speed; and
generate the braking control information using the slip ratio.

17. The computer program product of claim 16, wherein the instructions when executed by the one or more processors further cause the electronic mechanical braking apparatus to generate the braking control information to instruct the wheel brake to not change the braking force when the slip ratio is less than the first threshold and greater than the second threshold.

18. The computer program product of claim 15, wherein when the input information comprises the steering angle information and the yaw velocity information, the instructions when executed by the one or more processors further cause the electronic mechanical braking apparatus to:
calculate an expected turning degree using the steering angle information;
calculate an actual turning degree using the yaw velocity information; and
obtain the braking control information using a first deviation of the actual turning degree relative to the expected turning degree.

19. The computer program product of claim 18, wherein the instructions when executed by the one or more processors further cause the electronic mechanical braking apparatus to obtain the braking control information based on a relationship between the first deviation and a preset deviation threshold.

20. The computer program product of claim 18, wherein the instructions when executed by the one or more processors further cause the electronic mechanical braking apparatus to obtain the status information when a working status of the first control unit is changed.

* * * * *